United States Patent [19]

Weisert

[11] Patent Number: 4,509,671
[45] Date of Patent: Apr. 9, 1985

[54] METHOD OF PRODUCING DIFFUSION BONDED SUPERPLASTICALLY FORMED STRUCTURES

[75] Inventor: Edward D. Weisert, San Carlos, Calif.

[73] Assignee: Rockwell International Corporation, El Segundo, Calif.

[21] Appl. No.: 517,153

[22] Filed: Jul. 25, 1983

[51] Int. Cl.³ .............................................. B23K 31/02
[52] U.S. Cl. ...................................... 228/157; 228/193
[58] Field of Search .................. 228/118, 157, 173 A, 228/193, 265; 29/157.3 V; 72/60

[56] References Cited

U.S. PATENT DOCUMENTS

| 2,896,312 | 7/1959 | Schell | 29/157.3 V |
| 3,927,817 | 12/1975 | Hamilton et al. | 228/157 |
| 4,304,350 | 12/1981 | Paez et al. | 228/157 X |
| 4,331,284 | 5/1982 | Shulz et al. | 228/157 |
| 4,406,393 | 9/1983 | Aseani et al. | 228/157 |
| 4,426,032 | 1/1984 | Leodolter | 228/157 |

Primary Examiner—Kenneth J. Ramsey
Assistant Examiner—M. Jordan
Attorney, Agent, or Firm—Charles T. Silberberg; Max Geldin

[57] ABSTRACT

Process for producing metallic structures such as T-cap structures of a metal capable of diffusion bonding and superplastic forming, which comprises inserting at least two metal workpieces, for example, a titanium alloy, preferably in the form of sheets or diaphragms, in contact with each other in a tooling apparatus, and providing a space or cavity, e.g., of triangular shape, in the tooling above and below the workpieces along an area thereof. A sharp ridge is provided in the tooling at one end of the cavity to pinch off the workpieces at that point. The workpieces are diffusion bonded at preselected contacting areas thereof. The unbonded areas of the workpieces are then expanded by superplastic forming into contact with a wall of the tooling cavity, forming a hollow, e.g., triangular, cross-sectional shape. According to one embodiment, the cavity is then pressurized to collapse and compress the shaped cross-section back on itself against a wall of the cavity and the collapsed cross-section is diffusion bonded internally to form a thicker T-cap around the periphery of the diffusion bonded workpieces. According to another embodiment, after superplastic forming, the hollow shape, e.g. triangular shape, can be trimmed, to provide a peripheral flange or T-cap on the diffusion bonded workpieces, omitting the collapsing step of the first embodiment.

29 Claims, 12 Drawing Figures

METHOD OF PRODUCING DIFFUSION BONDED SUPERPLASTICALLY FORMED STRUCTURES

BACKGROUND OF THE INVENTION

This invention relates to the diffusion bonding of metals such as titanium, and its alloys, and which may be subsequently formed into structures by superplastic forming, and is particularly concerned with the production of structural members having preselected shapes such as T-caps by diffusion bonding and superplastic forming.

A number of alloys exhibit superplasticity and are capable of being subjected to superplastic forming to produce parts of predetermined shapes. Superplasticity is the capability of a material to develop unusually high tensile elongation with reduced tendency toward local necking during deformation. Prior to such superplastic forming, diffusion bonding of the metal workpieces is carried out to bond the workpieces in certain preselected areas, to permit superplastic forming to be carried out in the unbonded areas of the workpieces.

Structures have been successfully produced from a number of titanium-based alloys by the Superplastic Forming/Diffusion Bonding (SPF/DB) process. Such structures are producible because such metals or alloys exhibit the two essential physical properties required for SPF/DB, namely ability to be diffusion bonded and superplasticity.

Diffusion bonding refers to the solid-state, metallurgical joining of surfaces of similar or dissimilar metals by applying heat and pressure for a time duration so as to effect intimate surface contact and cause comingling of atoms at the joint interface.

Examples of metals which can be diffusion bonded and which have superplasticity characteristics include titanium, zirconium, refractory metals, and alloys thereof. Aluminum may also be suitable for this purpose, since recent developments indicate that aluminum and its alloys can be diffusion bonded, as well as being capable of superplastic forming.

U.S. Pat. No. 3,927,817 discloses a method for fabrication or structures in which metal blanks, preferably of a titanium alloy, are joined at selected areas by diffusion bonding at elevated temperatures and pressures, and then subjected to superplastic forming to form a desired structure. The metal blanks are first treated at selected areas with a stopoff material, such as yttria, boron nitride, graphite, or alumina, to prevent bonding at such treated areas during diffusion bonding. During superplastic forming the metal blanks are expanded at the treated (unbonded) areas into contact with shaping members by increasing the internal pressure, preferably with an inert gas, thus forming an expanded structure of a desired shape, essentially in a single operation.

Thus, after the bonds between adjacent metal blanks are formed during diffusion bonding, inert gas pressure, such as argon or helium, is applied to the interior network to superplastically form the unbonded protions of the adjacent metal sheets.

U.S. Pat. Nos. 4,303,570 and 4,331,284 are further illustrative of the production of diffusion bonded and superplastically formed structures and techniques employed therein.

It is an object of the present invention to provide a process for producing structural members incorporating preselected shapes.

Another object of the invention is the provision of procedure for the production of structural members incorporating preselected shapes, particularly T-caps, by diffusion bonding and superplastic forming.

A still further object is the provision in the above-noted procedure, of means in the form of special tooling apparatus to facilitate production of structural members incorporating preselected shapes such as symmetrical T-caps, by the SPF/DB process.

SUMMARY OF THE INVENTION

According to the present invention a method of producing metalic structures incorporating a predetermined shape, such as a T-cap, is provided by diffusion bonding and superplastic forming of at least two metal or metal alloy sheets, preferably employing certain tooling apparatus. In such tooling apparatus, a cavity of preselected shape, such as triangular, is provided adjacent a protion of the metal workpieces or sheets. The sheets to be diffusion bonded and superplastically formed are introduced into a tooling insert, which when assembled in the main tooling member, forms the above noted, e.g., triangular, cavity. The workpieces or sheets extend beyond the tooling insert across the cavity and are held at their opposite end in the main tooling member.

In preferred practice, a restriction or sharp ridge may be provided in the main tooling member at one end of the cavity opposite or remote from the tooling insert.

The sheets so positioned in the tooling apparatus are diffusion bonded under heat and pressure in the press containing the tooling, to bond preselected contacting areas of the workpieces within the tooling insert. However, the contacting areas of the workpieces which extend across the cavity do not bond, due to lack of press pressure across such areas. A slight gas pressure can be maintained between the contacting areas of the sheets extending across the cavity, as further assurance against bonding in such areas. Diffusion bonding is completed when sufficient time at diffusion bonding temperature has elapsed to effect complete diffusion bonding in the desired areas.

The unbonded areas or spaces between the sheets are then pressurized sufficiently to expand the upper and lower sheets into the cavity and into contact with the walls of the cavity, by superplastic forming. The result is the formation of a hollow, cross-sectional shape, e.g., a hollow triangular cross-sectional shape or flange, on the diffusion bonded part. The sides of such hollow shape may be trimmed to provide a peripheral flange or cap on the structure, or alternatively, the cavity externally of the expanded hollow, e.g., triangular, cross-sectional shape then may be pressurized causing the cross-sectional shape, for example the triangular cross-sectional shape, to collapse back on itself, and subsequently diffusion bonded internally to form the pre-selected shape such as a thick T-cap on the diffusion bonded part.

In its broad aspects there is thus provided according to the present invention a process for producing metallic structures of predetermined shape from at least two metal workpieces of a metal capable of diffusion bonding and superplastic forming which comprises:

inserting at least two of said metal workpieces in contact with each other in a tooling apparatus, providing a cavity in said tooling apparatus adjacent said workpieces along a preselected area thereof, diffusion bonding said workpieces at certain contacting areas thereof while leaving the preselected area adjacent to said cavity unbonded, and expanding said unbonded areas of said workpieces by superplastic forming to force the unbonded portion of at least one of said workpieces into contact with the walls of said cavity and forming a peripheral hollow, cross-sectional shape on said diffusion bonded workpieces.

The process may also include trimming said hollow shape to provide a peripheral cap on the diffusion bonded workpieces, or applying a differential pressure to said hollow shape in said cavity to collapse said hollow shape back on itself against a wall of the cavity to form a member of preselected shape, such as a structural cap around the workpiece periphery, on said diffusion bonded workpieces.

In preferred practice of the invention the cavity in the tooling apparatus extends above and below the workpieces, and the unbonded portions of at least two workpieces are expanded into contact with the walls of the cavity to form said hollow shape.

According to another feature of the invention, there is provided in the tooling apparatus adjacent to the cavity, a restriction, e.g. formed by spaced ridges, through which the workpieces pass, to reduce the thickness of the workpieces at such restriction following diffusion bonding, causing the workpieces to rupture at such restriction or ridges during pressurizing and collapse of the hollow shape back on itself.

Various modifications of the invention process include varying the cross-sectional geometry of the cavity in the tooling apparatus to form hollow configurations of varying shape within the cavity, and to control the collapsing behavior of the hollow cross-section. In this respect both symmetrical and asymmetrical shapes or designs of the hollow cross-sectional shape and of the cap produced by trimming or collapsing such hollow shape can be provided. Further, various other modifications of the process can be utilized to increase the thickness of the cap e.g., T-cap, formed on the part according to the invention, as described in detail hereinafter. Other embodiments of the invention are also described in greater detail below.

BRIEF DESCRIPTION OF THE DRAWINGS

The invention will be more readily understood by reference to the detailed description below of certain preferred embodiments taken in connection with the accompanying drawings wherein.

DETAILED DESCRIPTION OF THE INVENTION AND PREFERRED EMBODIMENTS

Figure 1:
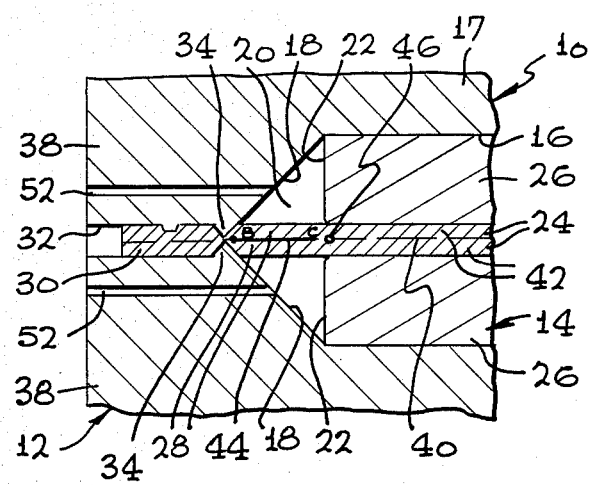
FIG. 1 is a cross-sectional view of the tooling apparatus, showing the main tooling member and a tooling insert assembled therein to provide a cavity, and a pair of workpieces contained within the tooling insert and the main tooling member, and extending across the cavity, following diffusion bonding of the workpieces.

Referring to FIG. 1 of the drawing, numeral 10 indicates a tooling apparatus comprising a main tooling member 12 and a tooling insert 14, The tooling insert is received within an opening or recess 16 on one side or at the periphery 17 of the main tooling member 12 and having inclined faces 18 at the inner end of the recess. When the insert 14 is received within the recess 16 of the main tooling member, a triangular shaped cavity 20 is formed by the inner ends 22 of the tooling insert 14 and the oppositely inclined surfaces 18 of the main tooling member 12.

A pair of metal or superplastic alloy sheets capable of diffusion bonding and superplastic forming, such as, for example, 6A1-4V titanium alloy, indicated at 24, are inserted in contact with each other between the lower and upper plates 26 of the tooling insert 14, the sheets or workpieces 24 extending for a substantial distance beyond the outer end faces 22 of the tooling insert. Thus, when the tooling insert 26 with the sheets 24 contained therein is inserted into the recess 16 of the main tooling member 12, as seen in FIG. 1, a portion 28 of the sheets 24 extends across the triangular shaped cavity 20, and the outer ends 30 of the sheets 24 are received within another recess 32 of the main tooling member 12, opposite recess 16. Opposing spaced sharp ridges 34 are provided in the main tooling member 12 at the apex of the triangular cavity 20 formed by the inclined walls 18 thereof, and between which the sheets 24 are passed. When the opposing plates 38 of the main tooling member are placed in compression during diffusion bonding described below, the ridges 34 function to thin or pinch off the work sheets at that point, as seen in FIG. 1.

The sheets 24 then are diffusion bonded by press pressure from a press (not shown) containing the tooling assembly 12, 14, with the workpieces or sheets 24 therein. Diffusion bonding is accomplished by heating the sheets in the tooling assembly to a suitable bonding temperature while pressure is applied to the sheets 24. Diffusion bonding temperatures can vary from 1450° F. to about 1850° F., e.g., about 1700° F. for 6A1-4V titanium alloy, and bonding pressure can vary from 100 psi to about 2,000 psi or more, usually from 150 to about 600 psi. The time for diffusion bonding can range from as little as 30 minutes up to several hours. As an example of a typical diffusion bonding cycle, is the use of 300 psi pressure applied for one and a half hours at 1700° F.

Figures 4, 4A:
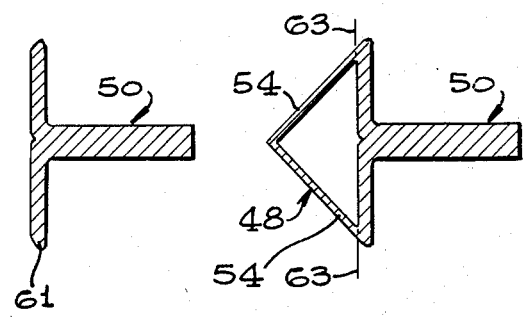
FIG. 4 shows the hollow, triangular cross-section connected to the diffusion bonded workpieces as shown in FIG. 2, produced by omitting the compression and collapsing step illustrated in FIG. 3.
FIG. 4a shows the provision of a peripheral T-cap on the diffusion bonded workpieces of FIG. 4, by trimming the hollow triangular cross-section of FIG. 4.

As a result of the diffusion bonding operation employing the tooling apparatus shown in FIG. 1, diffusion bonding of the sheets 24 occurs along a diffusion bond line indicated by dotted line 40, corresponding to the contacting surfaces of the sheets 24 of that portion 42 of the sheets contained within the insert 26, and to which diffusion bonding pressure was applied. However, over the contact area 44 of that portion of the sheets 24 where the cavity 20 is above and below the sheets, that is between points B and C, no bonding takes place due to lack of press pressure over that area, and also preferably by the imposition of a slight inert gas pressure, e.g., helium or argon, introduced into the space at the contacting area 44, by passage of such gas through inlet 46. If the contacting surfaces 44 are not to be subsequently bonded, e.g., as illustrated in FIGS. 4 and 4a, described below, a stop-off material, such as yttria, boron nitride, graphite, or aluminia can be applied to such contacting surfaces 44 of the worksheets 24 to prevent bonding at such treated areas during diffusion bonding, as known in the art. Also, there could be unbonded areas along portions of the contacting surfaces of sheets 24 within the insert 26, if stop-off material has been applied along such portions.

Figure 2:
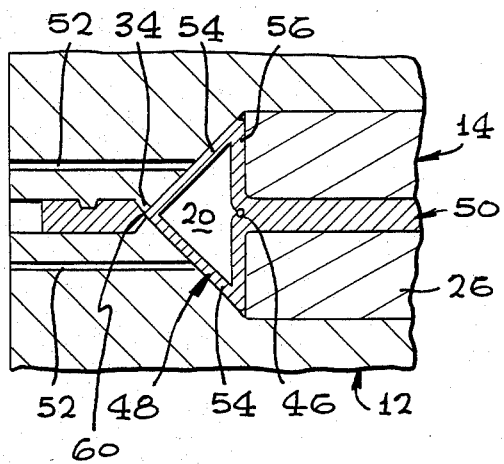
FIG. 2 is a cross-sectional view similar to FIG. 1, showing the expanded portions of the workpieces in contact with the walls of the cavity, following superplastic forming.

In the next step in the process, the inner space between the contacting areas 44 of the worksheets or diaphragms 24 is pressurized by passage of an inert gas such as argon or helium into such space through the the inlet 46. This pressurization at 44 between the portions 28 of the sheets 24 in the cavity 20 causes the upper and lower portions 28 of sheets 24 to expand into the cavity by superplastic forming so that the expanding sheet portions 28 contact the walls or surfaces 18 and 22 of the cavity and forming a peripheral hollow, triangular cross-section 48 on the part 50, as seen in FIG. 2, produced by diffusion bonding of the sheets 24 within the tooling insert 26. During such superplastic forming step, the residual bonding gas is vented through passages 52 formed in the main tooling member 12. Superplastic forming in the unbonded areas 44 of the workpieces is carried out at pressures of above 200 to about 400 psi, e.g., about 300 psi, while heating the workpieces at approximately the same temperature employed for diffusion bonding, i.e., 1650°–1750° F., e.g., about 1700° F., for 6A1-4V titanium alloy.

The superplastic forming and diffusion bonding operations per se are described in detail in above U.S. Pat. No. 3,927,817. Such disclosure is incorporated herein by reference but forms no part of the present invention.

Figure 3:
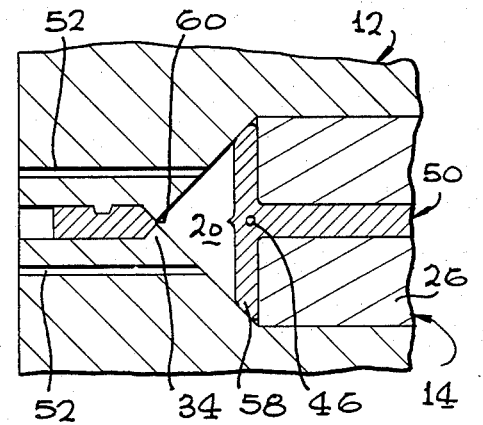
FIG. 3 is a view similar to FIG. 2, showing formation of a T-cap on the diffusion bonded workpieces, following compression and collapse of the hollow, triangular cross-section of FIG. 2, on itself.

According to one embodiment, in the next step of the process, and referring now also to FIG. 3 of the drawing, the gas inlet 46 becomes a vent, and when required, can be used to pull a vacuum to avoid trapped gas. The space or cavity 20 externally of the triangular shape 48 is then pressurized by an inert gas such as argon or helium, by passage of such gas through passages 52 of the main tooling member 12. This applies a differential pressure externally of the hollow triangular shape, sufficient to cause the sides 54 of the triangular shape 48 in FIG. 2 to collapse back against the base 56 of the triangular shape while at the same time, diffusion bonding occurs internally between parts 54 and 56, to form a thicker peripheral T-cap 58 on the part 50, as compared to the thickness of only the base member 56 of the triangular shape 48. The gas pressure applied during such pressurization to collapse triangular shape 48 can range from about 10 psi to about 100 psi, e.g., depending on the thickness of material forming the sides 54 of triangular shape 48, and the temperature can range from about 1650° F. to about 1700° F. It will be noted that during such pressurizing step, rupture of the narrow neck 60 formed by the pinched sheets 24 at the location of ridges 34, facilitates collapse of triangular shape 48 to force the sides 54 of the triangular shape back towards the base 56.

It will be noted that the cavity 20 and the triangular shape 48 are both in the form of an isosceles triangle, and the T-cap 58 formed by collapse of the triangular cross-section shape 48, on part 50 is symmetrical, as seen in FIG. 3.

According to another embodiment of the invention illustrated in FIG. 4, following diffusion bonding and superplastic forming in the process described above and illustrated in FIGS. 1 and 2, the diffusion bonded member or panel 50 having the peripheral triangular shape 48 as seen in FIG. 4 can be utilized per se without proceeding to the collapsing step to form the T-cap as shown in FIG. 3.

Further, as illustrated in FIG. 4a, according to a still further embodiment, a flange or T-cap 61 can be formed from the expanded or inflated triangular shape 48 of FIG. 4 simply by trimming or cutting off the sides 54 of triangular shape 48, at 63, resulting in a peripheral T-cap on the diffusion bonded part 50, although not as thick as the reinforced T-cap 58 in FIG. 3. This embodiment is of particular importance where it may be undesirable to collapse the inflated peripheral hollow shape 48 back on itself.

Figure 5:
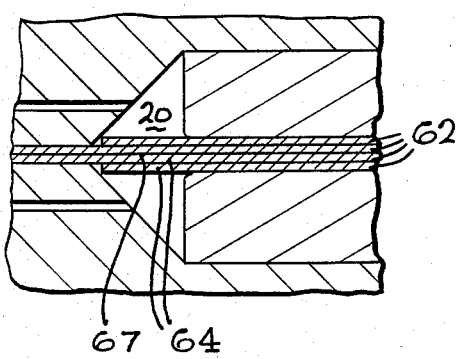
FIG. 5 illustrates a modification of the invention process, employing additional workpieces to increase the weight and thickness of the diffusion bonded workpieces.

Various additional modifications of the invention process can be made. Thus, for example, various doubler approaches can be used to increase further the thickness and strength of the T-cap shown in FIG. 3. For example, in FIG. 5, four worksheets 62 are employed so that following diffusion bonding of the sheets positioned in tooling insert 14, expansion of those portions 64 of the sheets adjacent to cavity 20, along the unbonded areas 67 between the two inner sheets will produce a triangular cross sectional shape of greater thickness and weight, than the triangular shape 48 in FIG. 2, and upon compression and collapse of such triangular shape, the resulting T-cap on the diffusion bonded sheets 62 will be thicker and heavier than the T-cap 58 on part 50 in FIG. 3.

Figure 6:
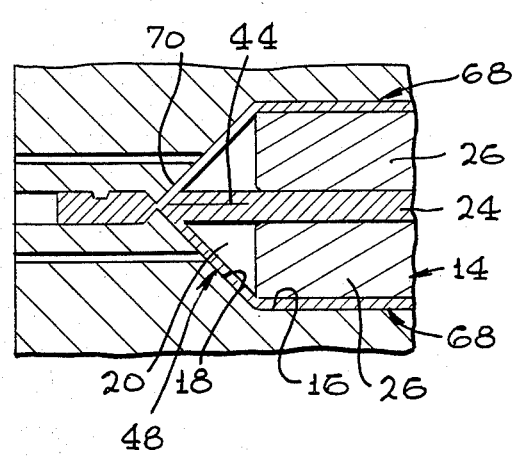
FIG. 6 is a view similar to FIG. 1, showing an additional embodiment employing auxilliary workpieces or diaphragms also to increase the thickness of the T-cap connected to the diffusion bonded workpieces.
Figure 7:
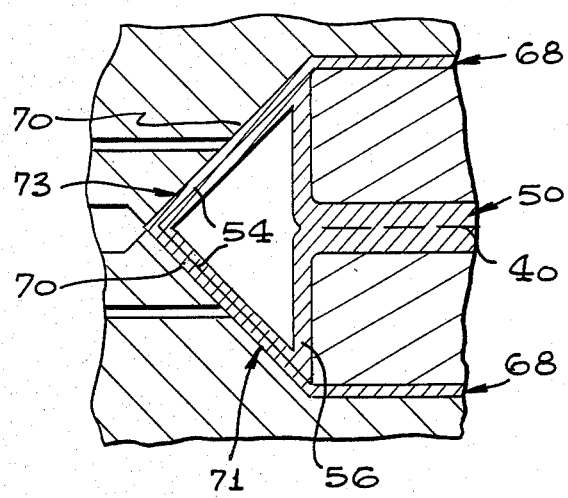
FIG. 7 is a view similar to FIG. 6, showing the hollow, expanded triangular cross-section of increased thickness, produced by superplastic forming of the diffusion bonded workpieces shown in FIG. 6.

Further, referring to FIG. 6, sealing of the cavity 20 during collapsing of the triangular shape 48, as illustrated in FIG. 3 and increasing the thickness of the T-cap can be controlled, for example increased, as shown in FIG. 6, by the use of additional or auxilliary sheets or diaphragms 68 positioned in the recess 16 externally of the upper and lower plates 26 of the tooling member and which also extend at 70 along the inclined faces or walls 18 of the cavity 20. Expansion of the sheets 24 along the unbonded areas 44 adjacent cavity 20, will expand such sheets into contact with the inclined portions 70 of the sheets 68, as shown at 54 in FIG. 7, thus increasing the thickness of the sides 71 of the resulting triangular shape 73 and forming a T-cap of greater thickness than in the case of FIG. 3, when such triangular shape including the inclined portions 70 of sheets 68 and the expanded sheet portions 54 are collapsed to form a T-cap on the diffusion bonded part 50, as in FIG. 3.

Figure 8:
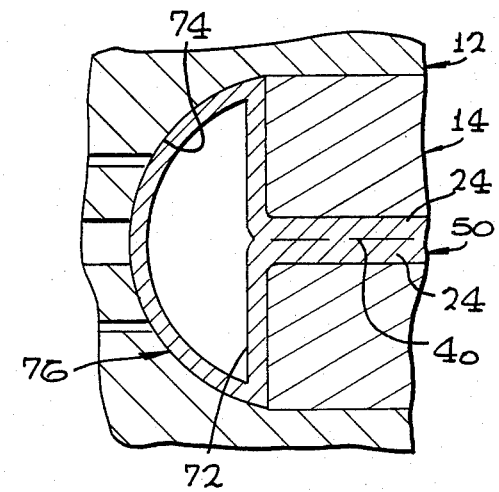
FIGS. 8, 9, 10 and 11 illustrate still other embodiments of the present invention.

In addition, the cross-sectional geometry of the cavity 20 can be varied to control the collapsing behavior of the cross-sectional shape. Thus, as illustrated in FIG. 8, the cavity 72 formed between the main tooling member 12 and the tooling insert 14 can have a semicircular shape formed by providing a semi-circular wall 74, on the main tooling member 12. Thus, following superplastic forming to expand the worksheets 24 across the cavity 72, a hollow semi-circular cross-sectional shape 76 is formed against the walls of the cavity, instead of the hollow triangular shaped cross-section 48 of FIG. 2. The resulting semi-circular shape can then be collapsed upon itself as described above, to form a symmetrical T-cap on member 50, similar to that shown in FIG. 3, or such collapsing step can be omitted to provide a part having a peripheral hollow semi-circular shape 76 on the diffusion bonded member 50.

Figures 9, 11:
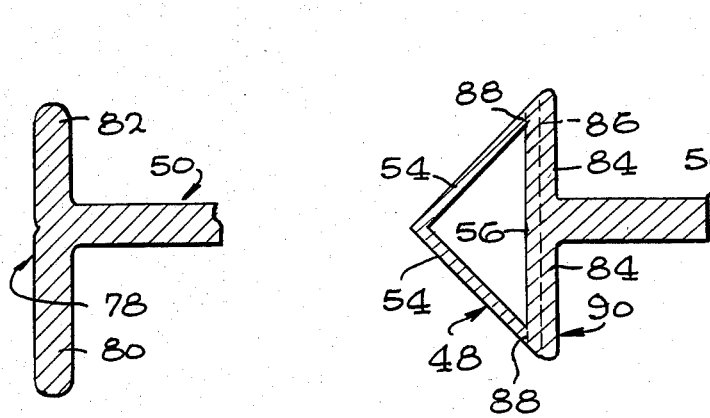

Asymmetrical forms of the cap are also feasible according to the invention process. Thus, as seen in FIG. 9, T-cap 78 on the diffusion bonded part 50 can be produced wherein one flange 80 of the T-cap is longer than the other flange 82 thereof, for example, by changing the shape of cavity 20 in the tooling apparatus 10 to form a hollow triangular shape by superplastic forming as shown in FIG. 3, wherein one side of the triangle is longer than the other.

Figure 10:
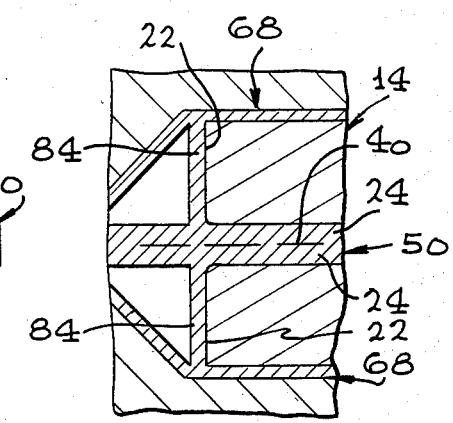

FIG. 10 illustrates still another embodiment wherein slightly oversized doublers at 84 in contact with the inner walls 22 of normal tooling insert 14 are diffusion bonded normal to the main member 50 under press pressure in the initial diffusion bonding step. Subsequently, the auxilliary sheets 68 employed in the embodiment in FIG. 6 are expanded against such doublers as in the step illustrated in FIG. 3, and are diffusion bonded thereto.

The concept illustrated in FIG. 10 relating to the diffusion bonding of the doublers 84 to the part 50 can also be applied to the embodiment illustrated in FIGS. 4 and 4a. Thus, viewing FIG. 11, following superplastic forming, as illustrated in FIG. 2, the base 56 of the expanded triangular shape 48 is diffusion bonded to doublers 84 along bond line 86, and the sides 54 of the triangular shape 48 are trimmed and removed, as by cutting at 88 to provide a peripheral T-cap 90 having a greater thickness than the T-cap 61 in FIG. 4a.

Further, the shape of the inner faces 22 of plates 26 of the tooling insert 14, can be changed from straight vertical faces as shown in FIG. 1, to for example, inclined or curved faces, thereby changing the shape of the resulting T-cap formed on the diffusion bonded part 50.

From the foregoing, it is seen that the invention provides a novel procedure and means in the form of tooling apparatus for producing structural members incorporating predetermined shapes such as T-caps which can be symmetrical or asymmetrical, and various other shapes, employing diffusion bonding and superplastic forming.

Since various changes and further modifications of the invention will occur to and can be made readily by those skilled in the art without departing from the invention concept, the invention is not to be taken as limited except by the scope of the appended claim.

I claim:

1. A process for producing metallic structures of predetermined shape from at least two metal workpieces capable of diffusion bonding and superplastic forming which comprises:
   inserting at least two of said metal workpieces in contact with each other in a tooling apparatus,
   providing a cavity in said tooling apparatus on opposite sides of said workpieces along a preselected area thereof,
   diffusion bonding said workpieces at certain contacting areas thereof while leaving the preselected area adjacent to said cavity unbonded, and
   expanding said unbonded areas of said workpieces by superplastic forming to force the unbonded portions of said at least two workpieces into contact with the walls of said cavity and forming a hollow, peripheral cross-sectional shape on said diffusion bonded workpieces.

2. A process for producing metallic structures of predetermined shape from at least two metal workpieces capable of diffusion bonding and superplastic forming which comprises:
   inserting at least two of said metal workpieces in contact with each other in a tooling apparatus,
   providing a cavity in said tooling apparatus adjacent said workpieces along a preselected area thereof,
   diffusion bonding said workpieces at certain contacting areas thereof while leaving the preselected area adjacent to said cavity unbonded,
   expanding said unbonded areas of said workpieces by superplastic forming to force the unbonded portion of at least one of said workpieces into contact with the walls of said cavity and forming a peripheral hollow, cross-sectional shape on said diffusion bonded workpieces, and,
   trimming said hollow shape formed during the superplastic forming operation to provide a peripheral cap on the diffusion bonded workpieces.

3. The process of claim 1, said workpieces being titanium alloy workpieces.

4. The process of claim 2, wherein said cavity extends above and below said workpieces along said preselected area thereof.

5. A process for producing metallic structures of predetermined shape from at least two metal workpieces capable °of diffusion bonding and superplastic forming which comprises:
   inserting at least two of said metal workpieces in contact with each other in a tooling apparatus,
   providing a cavity of essentially triangular shape in said tooling apparatus advacent said workpieces along a preselected area thereof,
   diffusion bonding said workpieces at certain contacting areas thereof while leaving the preselected area adjacent to said cavity unbonded,
   expanding said unbonded areas of said workpieces by superplastic forming to force the unbonded portion of at least one of said workpieces into contact with the walls of said cavity and forming a hollow triangular cross-section on said diffusion bonded workpieces, and
   removing the sides of said triangular cross-section to form a peripheral T-cap on the diffusion bonded workpieces.

6. A process for producing metallic structures of predetermined shape from at least two metal workpieces capable of diffusion bonding and superplastic forming which comprises:
   inserting at least two of said metal workpieces in contact with each other in a tooling apparatus,
   providing a cavity in said tooling apparatus adjacent said workpieces along a preselected area thereof,
   diffusion bonding said workpieces at certain contacting areas thereof while leaving the preselected area adjacent to said cavity unbonded,
   expanding said unbonded areas of said workpieces by superplastic forming to force the unbonded portion of at least one of said workpieces into contact with the walls of said cavity and forming a peripheral hollow, cross-sectional shape on said diffusion bonded workpieces, trimming said hollow shape to provide a peripheral cap on the diffusion bonded workpieces, and including adding an additional workpiece in contact with a wall of said cavity, and also diffusion bonding said additional workpiece to said at least two workpieces during said diffusion bonding step, whereby after said expanding and trimming steps, a peripheral cap of increased thickness is formed on the at least two diffusion bonded workpieces.

7. The process of claim 6, said cavity being of essentially triangular shape and said hollow shape being a hollow triangular cross-section, said trimming comprising removing the sides of said triangular cross-section to form a peripheral T-cap of increased thickness on the at least two diffusion bonded workpieces.

8. A process for producing metallic structures of predetermined shape from at least two metal workpieces capable of diffusion bonding and superplastic forming which comprises;

inserting at least two of said metal workpieces in contact with each other in a tooling apparatus, providing a cavity in said tooling apparatus adjacent said workpieces along a preselected area thereof, diffusion bonding said workpieces at certain contacting areas thereof while leaving the preselected area adjacent to said cavity unbonded, expanding said unbonded areas of said workpieces by superplastic forming to force the unbonded portion of at least one of said workpieces into contact with the walls of said cavity and forming a hollow, peripheral cross-sectional shape on said diffusion bonded workpieces, and applying a differential pressure to said hollow shape in said cavity to collapse said hollow shape back on itself against a wall of the cavity to form a member of preselected shape on said diffusion bonded workpieces.

9. A process for producing metallic structures of predetermined shape from at least two metal workpieces capable of diffusion bonding and superplastic forming, comprising:

inserting at least two of said metal workpieces in contact with each other in a tooling apparatus, providing a cavity in said tooling apparatus above and below said workpieces along a preselected area thereof, diffusion bonding said workpieces at certain contracting areas thereof, while leaving the preselected areas adjacent to said cavity unbonded, expanding said unbonded areas of said workpieces by superplastic forming to force the unbonded portions of said at least two workpieces into contact with the walls of said cavity and forming a peripheral hollow cross-sectional shape on said diffusion bonded workpieces, and applying a differential pressure externally of said hollow shape in said cavity to collapse said hollow shape back on itself against a wall of the cavity to form a member of preselected shape on said diffusion bonded workpieces.

10. The process of claim 9, said cavity being of essentially triangular shape and said hollow shape being a hollow triangular cross-section, said differential pressure collapsing said hollow triangular shape back on itself against the wall of said cavity to form a peripheral T-cap on the diffusion bonded workpieces.

11. The process of claim 9, including providing a restriction in the tooling apparatus adjacent said cavity, through which restriction said workpieces pass, to reduce the thickness of said workpieces at said restriction and facilitate rupture of said workpieces at said restriction during said collapse of said hollow shape back on itself.

12. The method of claim 11, said restriction being in the form of a sharp ridge which thins said workpieces at said ridge following said diffusion bonding, causing said workpieces to rupture at said ridge during said collapse of said hollow shape.

13. The process of claim 9, including adding an additional workpiece in contact with a wall of said cavity, whereby during said expanding of said unbonded portions of said workpieces, said unbonded portions are compressed against said additional workpiece in said cavity to thereby control the thickness of said member of preselected shape produced by collapse of said hollow shape.

14. The process of claim 9, said tooling apparatus including a main tooling member and a tooling insert, and tooling insert fitting into said main tooling member and forming said cavity in the resulting tooling assembly, said contacting workpieces passing through said tooling insert, with a portion of said contacting workpieces passing through said cavity.

15. The process of claim 14, said cavity being of essentially triangular shape and said hollow shape being a hollow triangular cross-section, said differential pressure collapsing said hollow triangular shape back on itself against the wall of said cavity to form peripheral a T-cap on the diffusion bonded workpieces.

16. The process of claim 15, including providing a restriction in the form of a ridge adjacent to said cavity, over which said workpieces pass, to thin and pinch said workpieces at said ridge following said diffusion bonding, causing said workpieces to rupture at said ridge during said collapse of said hollow shape back on itself.

17. The process of claim 16, including adding an additional workpiece in contact with a wall of said cavity, whereby during said expanding of said unbonded portions of said workpieces, said unbonded portions are compressed against said additional workpiece in said cavity to thereby control the thickness of said member of preselected shape produced by collapse of said hollow shape.

18. The process of claim 9, including maintaining an inert gas pressure during said diffusion bonding in the space between the contacting preselected areas of said workpieces adjacent said cavity, to assure that said preselected areas remain unbonded during diffusion bonding.

19. The process of claim 9, said workpieces being titanium alloy workpieces.

20. The process for producing metalic structures of predetermined shape from at least two metal workpieces of a metal capable of diffusion bonding and superplastic forming which comprises the following steps:

(a) inserting at least two of said workpieces into contact with each other in a tooling apparatus including a main tooling member and a tooling insert comprising an upper plate and a lower plate, said tooling insert fitting into a recess in said main tooling member and providing a cavity in said tooling apparatus above and below said workpieces along preselected contacting areas thereof, said cavity being formed between the inner end of said tooling insert and said main tooling member, the inner ends of said plates of said tooling insert forming a wall portion of said cavity, a portion of said contacting workpieces being positioned between the plates of said tooling insert, (b) diffusion bonding said workpieces at contacting areas thereof between the plates of said tooling insert while leaving said preselected contacting areas unbonded, and (c) introducing an inert gas under pressure into the space between said preselected unbonded contacting areas of said workpieces while heating same, to expand the unbonded portions of said workpieces adjacent said cavity by superplastic forming into contact with the walls of said cavity and forming a hollow cross-sectional shape peripherally connected to the diffusion bonded main portion of said workpieces between the plates of said tooling insert.

21. The process of claim 20, including trimming said hollow shape to provide a peripheral cap on the diffusion bonded workpieces.

22. The process of claim 21, said cavity being of essentially triangular shape and said hollow shape being a hollow triangular cross-section, said trimming comprising removing the sides of said triangular cross-section to form a peripheral T-cap on the diffusion bonded workpieces.

23. The process of claim 22, including adding an additional workpiece in contact with a wall of said cavity, and also diffusion bonding said additional workpiece to said at least two workpieces during said diffusion bonding step, whereby after said expanding and trimming steps, a peripheral T-cap of increased thickness is formed on the at least two diffusion bonded workpieces.

24. The process of claim 20, including introducing an inert gas under pressure into said cavity externally of said hollow cross-section shape while heating said workpieces, to collapse said hollow shape back on itself against said wall portion of said cavity formed by the inner ends of the plates of said tooling insert, and forming a member of preselected shape connected to one end of said diffusion bonded main portion of said workpieces.

25. The process of claim 24, said cavity being of essentially triangular shape and said hollow cross-sectional shape being a hollow triangular cross-section, the base of said triangle being positioned against said wall portion of said cavity formed by the inner ends of the plates of said tooling insert, said hollow triangular cross-section collapsing upon itself against the base of said triangular cross section to form a symmetrical T-cap on the diffusion bonded workpieces.

26. The process of claim 24, including providing a restriction in the form of oppositely disposed spaced ridges in the main tooling member adjacent said cavity, with said workpieces positioned between said ridges, said ridges pinching said workpieces adjacent one end of said cavity following said diffusion bonding, and causing said workpieces to rupture at said ridges during said collapse of said hollow shape.

27. The process of claim 24, including adding an additional workpiece in contact with a wall of said cavity, whereby during said expanding of said unbonded portions of said workpieces, said unbonded portions are compressed against said additional workpiece in said cavity to thereby control the thickness of said member of preselected shape produced by collapsing said hollow shape.

28. The process of claim 20, including maintaining an inert gas pressure during said diffusion bonding in the space between the preselected contacting areas of said workpieces adjacent said cavity, to assure that said preselected areas remain unbonded during diffusion bonding.

29. The process of claim 20, said workpieces being titanium alloy workpieces.

* * * * *